(12) United States Patent
Glöckner et al.

(10) Patent No.: US 12,409,737 B2
(45) Date of Patent: Sep. 9, 2025

(54) OUTPUT SPEED MONITORING FOR AN ELECTRIC DRIVE TRAIN

(71) Applicant: ZF FRIEDRICHSHAFEN AG, Friedrichshafen (DE)

(72) Inventors: Rico Glöckner, Pocking (DE); Migen Bebeti, Munich (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/838,264

(22) PCT Filed: Feb. 14, 2023

(86) PCT No.: PCT/EP2023/053617
§ 371 (c)(1),
(2) Date: Aug. 14, 2024

(87) PCT Pub. No.: WO2023/156379
PCT Pub. Date: Aug. 24, 2023

(65) Prior Publication Data
US 2025/0145012 A1    May 8, 2025

(30) Foreign Application Priority Data
Feb. 16, 2022 (DE) ............... 10 2022 201 604.1

(51) Int. Cl.
*B60L 15/10*    (2006.01)
*B60L 15/20*    (2006.01)

(52) U.S. Cl.
CPC ............ *B60L 15/10* (2013.01); *B60L 15/20* (2013.01); *B60L 2200/40* (2013.01);
(Continued)

(58) Field of Classification Search
CPC ...... B60L 15/10; B60L 15/20; B60L 2200/40; B60L 2240/16; B60L 2240/421; B60L 2250/26
(Continued)

(56) References Cited

U.S. PATENT DOCUMENTS 4,107,776 A * 8/1978 Beale ............... B60W 30/1819
701/99
4,354,568 A * 10/1982 Griesenbrock .... B60K 31/0075
180/274
(Continued)

FOREIGN PATENT DOCUMENTS

DE          4427697 A1    2/1995
DE    102018131964 A1    6/2020
(Continued)

*Primary Examiner* — Luis A Martinez Borrero
(74) *Attorney, Agent, or Firm* — LEYDIG, VOIT & MAYER, LTD.

(57) ABSTRACT

A method for monitoring an output speed of an electric drivetrain of a self-propelled work machine, including inputting an actual value for a longitudinal tilt of the self-propelled work machine and inputting an actual value for the output speed. The method further includes establishing a characteristic curve of a limit value for the output speed as a function of the longitudinal tilt of the self-propelled work machine and verifying whether, according to the input actual value for the longitudinal tilt, the input actual value for the output speed exceeds the limit value established in the characteristic curve. The method further includes outputting a control signal for bringing about an operationally safe state of the electric drivetrain according to a verification result based on the verification step.

12 Claims, 2 Drawing Sheets

Legend
10 Electric drivetrain
20 Control device
100 Self-propelled work machine

(52) U.S. Cl.
CPC ..... *B60L 2240/16* (2013.01); *B60L 2240/421* (2013.01); *B60L 2250/26* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 4,414,863 A * | 11/1983 | Heino | ................. | F16H 61/0213 477/65 |
| 5,126,942 A * | 6/1992 | Matsuda | ............ | B60K 23/0808 701/76 |
| 5,323,667 A * | 6/1994 | Tweed | ................. | F02D 31/007 477/122 |
| 5,389,051 A * | 2/1995 | Hirate | ................. | F02D 31/006 477/107 |
| 6,223,111 B1 * | 4/2001 | Cronin | ................... | F16H 61/46 477/68 |
| 6,546,329 B2 * | 4/2003 | Bellinger | ........... | B60W 30/1819 123/480 |
| 6,629,026 B1 * | 9/2003 | Baraszu | .................. | B60K 6/48 701/67 |
| 6,814,053 B2 * | 11/2004 | Hawkins | .............. | F02D 31/001 123/192.1 |
| 7,190,134 B2 * | 3/2007 | Shibata | ................... | H02P 29/50 318/400.23 |
| 8,579,759 B2 * | 11/2013 | Akebono | ........... | B60W 30/186 477/6 |
| 9,976,641 B2 * | 5/2018 | Caldwell | ................ | F04B 11/00 |
| 10,036,359 B2 * | 7/2018 | Hao | ........................ | B60K 6/48 |
| 11,752,878 B2 * | 9/2023 | Kim | ........................ | B60K 1/02 701/22 |
| 11,970,154 B2 * | 4/2024 | Yang | ........................ | B60L 3/102 |
| 2003/0216847 A1 * | 11/2003 | Bellinger | ................ | F16H 61/66 701/72 |
| 2005/0234622 A1 * | 10/2005 | Pillar | ........................ | G08G 1/20 701/41 |
| 2007/0192012 A1 * | 8/2007 | Letang | ................ | B60W 30/146 180/170 |
| 2009/0042688 A1 * | 2/2009 | Itou | ........................ | H02P 6/08 477/3 |
| 2009/0187316 A1 * | 7/2009 | Romine | ................. | B60K 17/28 701/51 |
| 2010/0025131 A1 * | 2/2010 | Gloceri | .................... | B60K 6/52 180/65.265 |
| 2011/0082630 A1 * | 4/2011 | Kawaguchi | ......... | F16H 61/0031 477/34 |
| 2011/0112708 A1 * | 5/2011 | Fassnacht | ............. | B60W 10/08 180/65.265 |
| 2012/0108387 A1 * | 5/2012 | Akebono | ............ | B60W 30/186 477/12 |
| 2012/0109478 A1 * | 5/2012 | Mochiyama | ........ | B60W 30/186 701/68 |
| 2012/0209464 A1 * | 8/2012 | Falkenstein | ....... | B60W 40/1005 903/902 |
| 2013/0090835 A1 * | 4/2013 | Take | ..................... | F02D 31/007 701/103 |
| 2013/0166121 A1 * | 6/2013 | Takeuchi | .............. | B60W 10/08 701/1 |
| 2014/0046561 A1 * | 2/2014 | Oohata | ............... | F16H 61/2807 701/65 |
| 2014/0277985 A1 * | 9/2014 | Zent | ......................... | B60T 8/175 701/83 |
| 2014/0288776 A1 * | 9/2014 | Anderson | ............... | F16F 9/064 701/37 |
| 2015/0105950 A1 * | 4/2015 | Fleege | ................ | B60L 15/2054 701/22 |
| 2015/0183427 A1 * | 7/2015 | Kuras | .................. | B60W 30/02 701/41 |
| 2015/0224845 A1 * | 8/2015 | Anderson | ............ | B60G 17/052 701/37 |
| 2015/0237797 A1 * | 8/2015 | Bejcek | ................. | A01D 34/006 56/10.8 |
| 2015/0259880 A1 * | 9/2015 | Sharma | ................. | E02F 9/2025 701/43 |
| 2015/0259883 A1 * | 9/2015 | Sharma | ................. | E02F 9/0841 701/41 |
| 2016/0121924 A1 * | 5/2016 | Norstad | ............... | B62D 5/0481 701/41 |
| 2016/0208898 A1 * | 7/2016 | Caldwell | ............ | F04B 11/0075 |
| 2016/0288781 A1 * | 10/2016 | Shim | ....................... | B60K 6/48 |
| 2023/0157203 A1 * | 5/2023 | Revelli | ................ | A01D 34/008 56/10.2 A |

FOREIGN PATENT DOCUMENTS

| | | |
|---|---|---|
| DE | 102019220357 A1 | 6/2021 |
| DE | 102020201497 A1 | 8/2021 |

* cited by examiner

Legend
10 Electric drivetrain
20 Control device
100 Self-propelled work machine

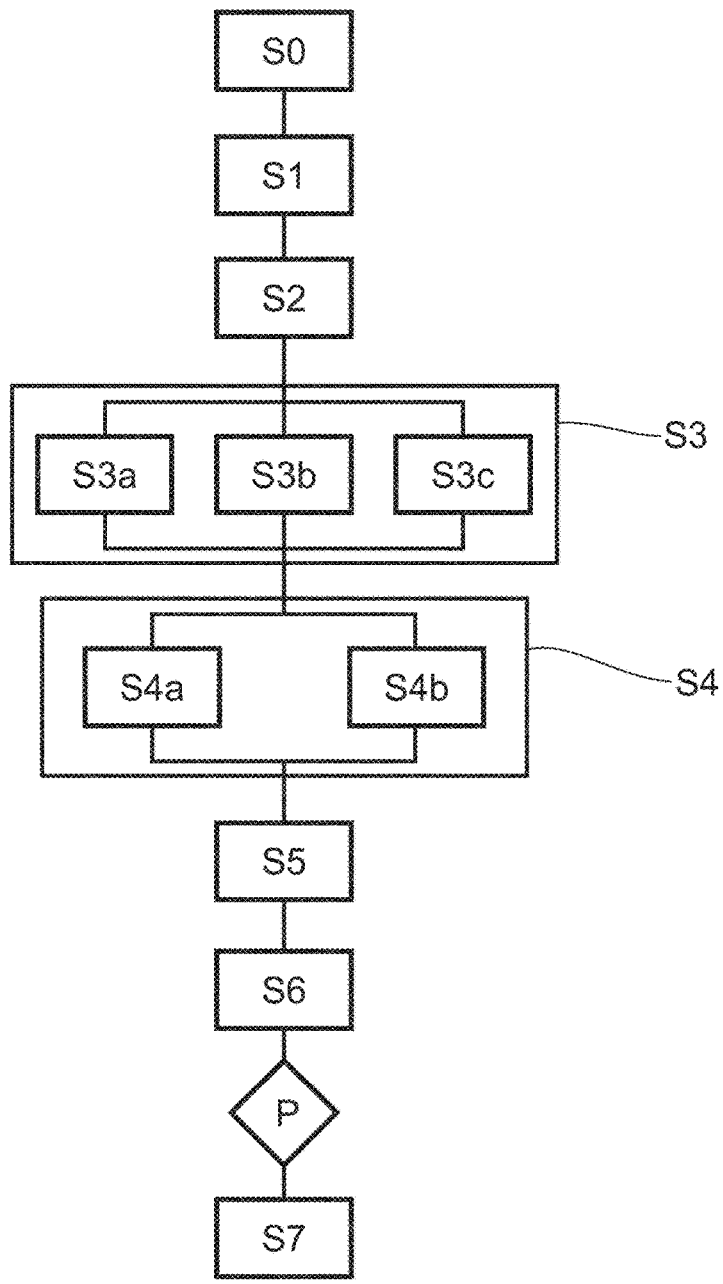

Fig. 2

Legend
S0 Determining stationary state
S1 Inputting driver request
S2 Determining target value
S3 Inputting actual value (av)
S3a Inputting av of output speed
S3b Inputting av of longitudinal tilt
S4 Ascertaining av
S4a Ascertaining av of output speed gradient
S4b Ascertaining av of longitudinal jerk
S5 Establishing characteristic curve
S6 Verifying av of output speed
S7 Outputting control signal

OUTPUT SPEED MONITORING FOR AN ELECTRIC DRIVE TRAIN

CROSS REFERENCE TO RELATED APPLICATIONS

This application is a U.S. National Phase application under 35 U.S.C. § 371 of International Application No. PCT/EP2023/053617, filed on Feb. 14, 2023, and claims benefit to German Patent Application No. DE 10 2022 201 604.1, filed on Feb. 16, 2022. The International Application was published in German on Aug. 24, 2023 as WO 2023/156379 A1 under PCT Article 21 (2).

FIELD

The present invention relates to a method and to a control device for monitoring an output speed of an electric drivetrain of a self-propelled work machine, and to a self-propelled work machine comprising an electric drivetrain and a control device of that kind.

BACKGROUND

It is known from the prior art to limit controlled variables for actuating an electric motor in order to ensure the electric motor is operated safely. For this purpose, a maximum controlled variable can be predefined in relation to an operating parameter of the electric motor.

To monitor an output speed resulting from such controlled variables, however, limiting controlled variables in an electric drivetrain may not be sufficient to avoid safety-relevant divergences in the output speed in the electric drivetrain.

SUMMARY

In an embodiment, the present disclosure provides a method for monitoring an output speed of an electric drivetrain of a self-propelled work machine, comprising inputting an actual value for a longitudinal tilt of the self-propelled work machine and inputting an actual value for the output speed. The method further comprises establishing a characteristic curve of a limit value for the output speed as a function of the longitudinal tilt of the self-propelled work machine and verifying whether, according to the input actual value for the longitudinal tilt, the input actual value for the output speed exceeds the limit value established in the characteristic curve. The method further comprises outputting a control signal for bringing about an operationally safe state of the electric drivetrain according to a verification result based on the verification step.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 2 illustrates a flowchart comprising method steps for carrying out a method for monitoring an output speed of an electric drivetrain of a self-propelled work machine.

DETAILED DESCRIPTION

Figure 1:
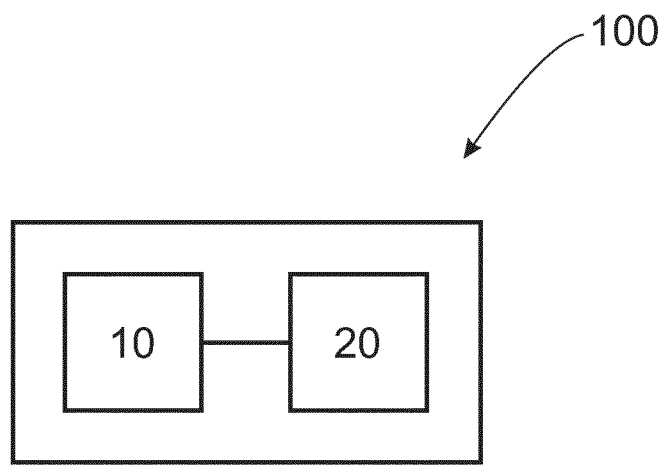
FIG. 1 schematically illustrates a self-propelled work machine and a control device according to an embodiment of the invention.

In an aspect, the present disclosure relates to a method for monitoring an output speed of an electric drivetrain of a self-propelled work machine.

As one step, the method comprises inputting an actual value for a longitudinal tilt of the self-propelled work machine. The self-propelled work machine can be a construction machine or an agricultural work machine, for example. According to an embodiment, the self-propelled work machine is a wheeled loader. The method for monitoring the output speed can be carried out in order to operate the electric drivetrain in an operationally safe state in which an undesirable output speed can be avoided. The output speed of the electric drivetrain can be an output speed of an electric motor, a transmission, or a wheel in the electric drivetrain.

The longitudinal tilt of the self-propelled work machine can have an angle between a longitudinal axis of the self-propelled work machine and a horizontal. The longitudinal tilt of the self-propelled work machine can be set on the basis of a tilt of the ground on which the self-propelled work machine is found. The longitudinal tilt of the self-propelled work machine can also be set on the basis of an orientation of the longitudinal axis in relation to the ground.

As a further step, the method can comprise acquiring the actual value for the longitudinal tilt using a sensor. Alternatively or additionally, as a further step the method can comprise reading out the actual value from a geographic information system. The sensor can be a tilt sensor which can be arranged on the self-propelled work machine. Alternatively or additionally, the sensor can be a position acquisition sensor, for example a GNSS sensor. Furthermore, the sensor can be an acceleration sensor or a gyroscope. The sensor can also be at least one oil level sensor, preferably two oil level sensor units, which can operate according to the principle of a hydrostatic level on the self-propelled work machine. According to an embodiment, the longitudinal tilt of the self-propelled work machine can be read out from the geographic information system on the basis of a position acquired using the position sensor.

As a further step, the method comprises inputting an actual value for the output speed. According to an embodiment, the output speed can be read out from the inverter of the electric drivetrain; the read-out output speed can be the actual speed of the electric motor. As a further step, the method can comprise acquiring the actual value using a speed sensor. At least one of the aforementioned components of the electric drivetrain can comprise the speed sensor. The actual value can be read out from the speed sensor either directly or indirectly. The speed sensor can be configured to tap the actual value from at least one of the aforementioned components of the electric drivetrain.

As a further step, the method comprises establishing a characteristic curve of a limit value for the output speed as a function of the longitudinal tilt of the self-propelled work machine. The characteristic curve can be stored in software of one of the aforementioned controllers. The characteristic curve can define a maximum value for the output speed as a function of the longitudinal tilt. The limit value for the output speed can be a limit value of an output speed gradient or of an acceleration. The limit value of the output speed gradient can have at least one out of a negative output speed gradient and a positive output speed gradient. The characteristic curve can thus act to limit the output speed. The limit value for the output speed can also be a limit value of a gradient of the output speed gradient or of a jerk. The limit value of the gradient of the output speed gradient can have at least one out of a negative gradient of the output speed gradient and a positive gradient of the output speed gradient. Thus, the limit value for the output speed can be established as a function of the longitudinal tilt. According to an embodiment, when the longitudinal tilt is a downward grade, a higher limit value can be established in accordance with the previous embodiment than when the longitudinal tilt is an upward grade.

As a further step, the method comprises verifying whether, according to the input actual value for the longitudinal tilt, the input actual value for the output speed exceeds the limit value established in the characteristic curve. Alternatively or additionally, the verification step can be carried out according to the determined target value for the torque. A verification result based on the verification step can be that the input actual value for the longitudinal tilt exceeds the predetermined longitudinal tilt limit value. A further verification result based on the verification step can be that the input actual value for the longitudinal tilt does not exceed the predetermined limit value for the longitudinal tilt. In the verification step, therefore, an erroneous or undesirable actual value for the output speed can be detected. An erroneous or critical speed, or an erroneous or critical torque, can thus be prevented.

According to an embodiment, as a further step the method can comprise verifying whether, according to the determined target value for the torque, the input actual value for the output speed exceeds the limit value established in the characteristic curve. A verification result based on the verification step can be that, according to the determined target value for the torque, the input actual value for the output speed exceeds the limit value established in the characteristic curve. A further verification result based on the verification step can be that, according to the determined target value for the torque, the input actual value for the output speed does not exceed the limit value established in the characteristic curve.

As a further step, the method comprises outputting a control signal for bringing about an operationally safe state of the electric drivetrain according to a verification result based on the verification step. The control signal can be output if a verification result based on the verification step shows that, according to the input actual value for the longitudinal tilt, the input actual value for the longitudinal tilt exceeds the limit value established in the characteristic curve. According to an embodiment, the step of outputting the control signal is not carried out if a verification result based on the verification step shows that, according to the input actual value for the longitudinal tilt, the input actual value for the longitudinal tilt does not exceed the limit value established in the characteristic curve. In the step of outputting the control signal, said control signal can be output to at least one of the aforementioned components of the electric drivetrain in order to actuate them and bring about the operationally safe state of the electric drivetrain.

According to an embodiment of the method, the control signal can be output if a verification result based on the verification step shows that, according to the determined target value for the torque, the input actual value for the output speed exceeds the limit value established in the characteristic curve. According to an embodiment, the step of outputting the control signal is not carried out if a verification result based on the verification step shows that, according to the determined target value for the torque, the input actual value for the output speed does not exceed the limit value established in the characteristic curve. In the step of outputting the control signal, said control signal can be output to at least one of the aforementioned components of the electric drivetrain in order to actuate them and bring about the operationally safe state of the electric drivetrain.

Using embodiments of the present disclosure, a resulting output speed of the electric drivetrain can be monitored directly and action can be taken in the electric drivetrain on that basis in order to bring about an operationally safe state if the output speed is erroneous. Furthermore, embodiments of the present disclosure allow the resulting output speed itself to be limited and monitored as a response by the electric drivetrain to its actuation, in order to bring about the operationally safe state. Intrinsic safety of an electric drivetrain can thus be efficiently ensured. This is particularly advantageous if the electric drivetrain has direct drive.

According to an embodiment of the method, as a further step it can comprise ascertaining an actual value of an output speed gradient of the self-propelled work machine on the basis of the input actual value for the output speed. The output speed gradient can be an output speed curve of the electric drivetrain. As a further step, the method can comprise inputting the output speed curve. The output speed curve can be an output speed curve of the electric motor, the transmission, or the wheel in the electric drivetrain. As a further step, the method can comprise acquiring the output speed curve using the speed sensor. The output speed curve can be read out from the speed sensor either directly or indirectly. The output speed curve can also be determined on the basis of at least two input output speeds.

In accordance with the previous embodiment, a limit value for the output speed gradient of the self-propelled work machine can be established in the step of establishing the characteristic curve. The limit value for the output speed gradient can be established according to the input actual value for either the longitudinal tilt or a target value for the torque. The characteristic curve can thus define a maximum value for the output speed gradient. According to this embodiment, in the verification step, a verification can be carried out as to whether the ascertained actual value of the output speed gradient exceeds the limit value for the output speed gradient as established in the characteristic curve. A verification result based on the verification step can be that the ascertained actual value of the output gradient exceeds the limit value for the output speed gradient as established in the characteristic curve. A further verification result based on the verification step can be that the ascertained actual value of the output speed gradient does not exceed the limit value for the output speed gradient as established in the characteristic curve.

In accordance with the previous embodiment, the step of outputting the control signal can be carried out if the verification result shows that the ascertained actual value of the output speed gradient exceeds the limit value for the output speed gradient as established in the characteristic curve. According to an embodiment, the step of outputting the control signal is not carried out if the verification result shows that the ascertained actual value of the output speed gradient does not exceed the limit value for the output speed gradient as established in the characteristic curve. According to this embodiment, the output speed gradient of the electrical actuation can be monitored efficiently.

According to a further embodiment of the method, as a further step it can comprise ascertaining an actual value of a longitudinal jerk of the self-propelled work machine on the basis of the input actual value for the output speed. The longitudinal jerk can be a gradient of the output speed gradient of the self-propelled work machine, and the output speed gradient can define a longitudinal acceleration of the self-propelled work machine.

In accordance with the previous embodiment, a limit value for the longitudinal jerk of the self-propelled work machine can be established in the step of establishing the characteristic curve. The limit value for the longitudinal jerk of the self-propelled work machine can be established according to the input actual value for either the longitudinal tilt or a target value for the torque. The characteristic curve can thus define a maximum value for the longitudinal jerk. According to this embodiment, in the verification step, a verification can be carried out as to whether the ascertained actual value of the longitudinal jerk exceeds the limit value for the longitudinal jerk as established in the characteristic curve. A verification result based on the verification step can be that the ascertained actual value of the longitudinal jerk exceeds the limit value for the longitudinal jerk as established in the characteristic curve. A further verification result based on the verification step can be that the ascertained actual value of the longitudinal jerk does not exceed the limit value for the longitudinal jerk as established in the characteristic curve.

In accordance with the previous embodiment, the step of outputting the control signal can be carried out if the verification result shows that the ascertained actual value of the longitudinal jerk exceeds the limit value for the longitudinal jerk as established in the characteristic curve. According to an embodiment, the step of outputting the control signal is not carried out if the verification result shows that the ascertained actual value of the longitudinal jerk does not exceed the limit value for the longitudinal jerk as established in the characteristic curve. According to this embodiment, the longitudinal jerk of the self-propelled work machine can be monitored efficiently.

According to a further embodiment of the method, as a further step it comprises determining a target value for a torque of the electric drivetrain. The target value for the torque can be a corresponding target value specified to the electric motor by a controller. Alternatively or additionally, the target value for the torque can be a corresponding target value specified to the transmission by a transmission controller. The torque of the electric drivetrain can comprise at least one out of a driving torque of the electric drivetrain and an output torque of the electric drivetrain. The driving torque and the output torque can each be a corresponding torque of one of the aforementioned components of the electric drivetrain. According to this embodiment of the method, the step of establishing the characteristic curve can be carried out as a function of the torque. The target value for the torque can be provided by the controller in order for said target value to be output to the electric motor, an inverter, or power electronics in the electric drivetrain. The target value for the torque can be communicated to the electric drivetrain by the controller according to a driver request. The target value for the torque can be provided by the transmission controller in order for said target value to be output to the transmission, an inverter, or power electronics in the electric drivetrain. The target value for the torque can be communicated to the electric drivetrain by the transmission controller according to a driver request.

According to a further embodiment of the method, as a further step it can comprise inputting a driver request for the electric drivetrain to longitudinally drive the self-propelled work machine. The driver request can comprise at least one out of a gas pedal position for accelerating or decelerating the self-propelled work machine, a brake pedal position for braking the self-propelled work machine, and a switch position of a driving direction switch for adjusting a driving direction of the self-propelled work machine. According to this embodiment, the step of determining the target value for the torque can be carried out on the basis of the input driver request. The target value can be determined according to the input driver request.

According to a further embodiment of the method, as a further step it can comprise inputting a driver request for the electric drivetrain to longitudinally drive the self-propelled work machine. According to this embodiment, the step of establishing the characteristic curve can be carried out as a function of the input driver request. Thus, the limit value for the output speed can be established or varied according to the input driver request. The limit value for the output speed can be established or varied proportionally to the input driver request. The verification step can also be carried out according to the input driver request. As a further step, the method can comprise verifying whether the input driver request exceeds a predetermined limit value for the driver request. The step of outputting the control signal can be carried out according to a verification result based on the verification step.

According to a further embodiment of the method, the step of establishing the characteristic curve can be carried out as a function of the input actual value for the output speed. Thus, the limit value for the output speed can also be established or varied according to the input actual value for the output speed. The verification step can therefore be carried out according to the input actual value for the output speed.

According to a further embodiment of the method, as a further step it can comprise debouncing or filtering the input actual value for the output speed. According to this embodiment, in the verification step, a verification can be carried out as to whether the debounced or filtered actual value for the output speed exceeds the limit value established in the characteristic curve. The verification step can thus be carried out even more reliably.

According to a further embodiment of the method, as a further step it can comprise determining whether the self-propelled work machine is in a stationary state. According to this embodiment, the step of outputting the control signal can be carried out if the self-propelled work machine is in a stationary state. According to this embodiment, at least one further step of the method can be carried out if the self-propelled work machine is in a stationary state. Thus, the self-propelled work machine can be driven out of a stationary state in a safe operating state of the self-propelled work machine. In this way, undesirable acceleration of the self-propelled work machine out of the stationary state can be avoided.

According to a further embodiment of the method, in the step of outputting the control signal, a control signal for deactivating at least one drive component in the electric drivetrain can be output for bringing about the operationally safe state according to the verification result based on the verification step. According to an embodiment, the control signal is output to the inverter of the electric drivetrain. The control signal can be configured to switch at least one component of the electric drivetrain to a zero-torque state via the inverter. Thus, the operationally safe state of the electric drivetrain can be efficiently brought about.

In a further aspect, the present disclosure relates to a control device for monitoring an output speed of an electric drivetrain of a self-propelled work machine. The control device can be configured to carry out the method according to the preceding aspect. The control device can comprise corresponding units and interfaces that are configured to carry out the steps of the method.

The control device comprises a unit for inputting an actual value for a longitudinal tilt of the self-propelled work machine. The control device can comprise a unit for determining a target value for a torque of the electric drivetrain. The control device comprises an interface for inputting an actual value for the output speed. The control device comprises a unit for establishing a characteristic curve of a limit value for the output speed as a function of the longitudinal tilt of the self-propelled work machine. The unit can be configured to establish the characteristic curve as a function of the torque. The control device comprises a unit for verifying whether, according to the input actual value for the longitudinal tilt, the input actual value for the output speed exceeds the limit value established in the characteristic curve. The unit can be configured to verify whether, according to the determined target value for the torque, the input actual value for the output speed exceeds the limit value established in the characteristic curve. Furthermore, the control device comprises an interface for outputting a control signal for bringing about an operationally safe state of the electric drivetrain according to a verification result based on the verification. According to an embodiment, the control device can be one of the controllers according to the preceding aspect.

In a further aspect, the present disclosure relates to a self-propelled work machine. The self-propelled work machine can be a work machine described in relation to the preceding aspects. The self-propelled work machine comprises an electric drivetrain. In addition, the self-propelled work machine comprises a control device according to the preceding aspect for monitoring an output speed of the electric drivetrain.

Embodiments and features of one aspect of the present disclosure can constitute corresponding embodiments and features of a further aspect of the present disclosure.

FIG. 1 schematically shows a self-propelled work machine 100. The self-propelled work machine 100 comprises an electric drivetrain 10 and a control device 20. The control device 20 is configured to monitor an output speed of the electric drivetrain 10. For this purpose, the control device 20 is configured to carry out the method steps shown in FIG. 2. The control device 20 and the electric drivetrain 10 are interconnected by means of respective interfaces. The control device 20 is configured to monitor the output speed of at least one component of the electric drivetrain 10. According to an embodiment, the component is an electric motor of the electric drivetrain 10.

FIG. 2 is a flowchart comprising method steps for carrying out a method for monitoring the output speed of the electric drivetrain 10 of the self-propelled work machine 100 using the control device 20. The method steps are shown in sequential order according to an embodiment of the method.

In a first step S0 of the method, a stationary state of the self-propelled work machine 100 is determined. According to an embodiment of the method, the further steps of the method are carried out if it has been determined that the self-propelled work machine 100 is in a stationary state. In a further step S1 of the method, a driver request is input. According to an embodiment of the method, the driver request is input from a gas pedal that a driver can operate.

In a further step S2 of the method, a target value for a torque of the electric drivetrain 10 is determined. The target value for the torque is determined on the basis of the input driver request.

In a further step S3 of the method, an actual value based on the output speed is input from the electric drivetrain 10. In a sub-step S3a, an actual value for the output speed is input. In a further sub-step S3b, an actual value of a longitudinal tilt of the self-propelled work machine 100 is input. In a further optional sub-step S3c, a driver request for the self-propelled work machine 100 to be longitudinally driven is input. In a first step S4 of the method, an actual value dependent on the output speed is ascertained. In a further sub-step S4a, an actual value of an output speed gradient of the self-propelled work machine 100 is ascertained. In a further sub-step S4b, an actual value of a longitudinal jerk of the self-propelled work machine 100 is ascertained. The ascertaining sub-steps S4a, S4b are based on at least one actual value input during the step.

In a further step S5 of the method, a characteristic curve of a limit value for the output speed is established as a function of the determined target value for the torque. According to a relevant embodiment, in the step of establishing the characteristic curve, a limit value for the output speed gradient and a limit value for the longitudinal jerk of the self-propelled work machine 100 are established.

In a further step S6 of the method, a verification is carried out as to whether, according to the determined target value for the torque, the input actual value for the output speed exceeds the limit value established in the characteristic curve. If a verification result P of the verification step shows that the input actual value for the output speed exceeds the limit value established in the characteristic curve, a control signal is output in a further step S7 of the method. The control signal is output for bringing about an operationally safe state of the electric drivetrain 10. According to an embodiment, at least one component of the electric drivetrain 10 is switched off in order to bring about the operationally safe state.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

10 Electric drivetrain
20 Control device
100 Self-propelled work machine
P Verification result
S0 Determining a stationary state
S1 Inputting a driver request
S2 Determining a target value
S3 Inputting an actual value
S3a Inputting an actual value of an output speed
S3b Inputting an actual value of a longitudinal tilt
S3c Inputting a driver request
S4 Ascertaining actual value
S4a Ascertaining an actual value of an output speed gradient
S4b Ascertaining an actual value of a longitudinal jerk
S5 Establishing a characteristic curve
S6 Verifying an actual value of an output speed
S7 Outputting a control signal

The invention claimed is:

1. A method for controlling an output speed of an electric drivetrain of a self-propelled work machine, comprising:
    inputting an actual value for a longitudinal tilt of the self-propelled work machine;
    inputting an actual value for the output speed;
    establishing a characteristic curve of a limit value for the output speed as a function of the longitudinal tilt of the self-propelled work machine;
    verifying whether, according to the input actual value for the longitudinal tilt, the input actual value for the output speed exceeds the limit value established in the characteristic curve; and
    operating an electric drivetrain by outputting a control signal configured to operate the electric drivetrain according to a verification result based on the verification step.

2. The method according to claim 1, further comprising ascertaining an actual value of an output speed gradient of the self-propelled work machine on based on the input actual value for the output speed, a limit value for the output speed gradient of the self-propelled work machine being established in the step of establishing the characteristic curve, and a verification being carried out in the verification step as to whether the ascertained actual value of the output speed gradient exceeds the limit value for the output speed gradient as established in the characteristic curve.

3. The method according to claim 1, further comprising ascertaining an actual value of a longitudinal jerk of the self-propelled work machine based on the input actual value for the output speed, a limit value for the longitudinal jerk of the self-propelled work machine being established in the step of establishing the characteristic curve, and a verification being carried out in the verification step as to whether the ascertained actual value of the longitudinal jerk exceeds the limit value for the longitudinal jerk as established in the characteristic curve.

4. The method according to claim 1, further comprising determining a target value for a torque of the electric drivetrain, the step of establishing the characteristic curve being carried out as a function of the torque.

5. The method according to claim 4, further comprising inputting a driver request for the electric drivetrain to drive the self-propelled work machine longitudinally, the step of determining the target value for the torque being carried out based on the input driver request.

6. The method according to claim 1, further comprising inputting a driver request for the electric drivetrain to drive the self-propelled work machine longitudinally, the step of establishing the characteristic curve being carried out as a function of the input driver request.

7. The method according to claim 1, wherein the step of establishing the characteristic curve is carried out as a function of the input actual value for the output speed.

8. The method according to claim 1, further comprising debouncing the input actual value for the output speed, a verification being carried out in the verification step as to whether the debounced actual value for the output speed exceeds the limit value established in the characteristic curve.

9. The method according to claim 1, further comprising determining whether the self-propelled work machine is in a stationary state, the step of outputting the control signal being carried out if the self-propelled work machine is in a stationary state.

10. The method according to claim 1, wherein in the step of outputting the control signal, a control signal for deactivating at least one drive component in the electric drivetrain is output for bringing about the operationally safe state according to the verification result based on the verification step.

11. A control device for controlling an output speed of an electric drivetrain of a self-propelled work machine, comprising:
    an input unit for inputting an actual value for a longitudinal tilt of the self-propelled work machine;
    an interface for inputting an actual value for the output speed;
    an establishing unit for establishing a characteristic curve of a limit value for the output speed as a function of the longitudinal tilt of the self-propelled work machine;
    a verifying unit for verifying whether, according to the input actual value for the longitudinal tilt, the input actual value for the output speed exceeds the limit value established in the characteristic curve; and
    an interface configured to control the electric drivetrain by outputting a control signal configured to operate the electric drivetrain according to a verification result based on the verification.

12. A self-propelled work machine comprising:
    an electric drivetrain; and
    the control device according to claim 11 for monitoring an output speed of the electric drivetrain.

* * * * *